United States Patent [19]
Simon et al.

[11] Patent Number: 5,347,471
[45] Date of Patent: Sep. 13, 1994

[54] CHECKING FIXTURE WITH COMPUTER COMPENSATION FOR DATA COLLECTION DEVICE LOCATORS

[75] Inventors: David L. Simon, Grosse Pointe Woods; Scott M. Kloock, Washington, both of Mich.

[73] Assignee: Simco Industries, Inc., Roseville, Mich.

[21] Appl. No.: 947,253

[22] Filed: Sep. 18, 1992

[51] Int. Cl.[5] .......................... G01B 3/28; G06F 15/46
[52] U.S. Cl. ..................................... 364/559; 33/502; 364/474.35; 364/551.02; 364/552; 364/560
[58] Field of Search .................... 364/550, 551.01, 552, 364/559, 474.34, 474.35, 474.36, 560, 551.02; 33/502, 557, 558, 572

[56] References Cited

U.S. PATENT DOCUMENTS

| | | | |
|---|---|---|---|
| 4,672,562 | 6/1987 | Egli et al. .............................. | 364/559 |
| 4,811,250 | 3/1989 | Steber ................................. | 364/559 X |
| 4,827,436 | 5/1989 | Sabersky et al. ................ | 364/552 X |
| 4,831,561 | 5/1989 | Utsumi ................................ | 364/560 |
| 4,831,741 | 5/1989 | Sogoian ........................... | 364/552 X |
| 4,841,460 | 6/1989 | Dewar et al. ..................... | 364/559 X |
| 4,956,764 | 9/1990 | Carver et al. .................... | 364/552 X |
| 5,140,533 | 8/1992 | Celette ................................. | 364/559 |

*Primary Examiner*—Kevin J. Teska
*Attorney, Agent, or Firm*—Dorn, McEachran, Jambor & Keating

[57] ABSTRACT

A checking fixture for checking the accuracy of manufactured parts has a base with origin surfaces or tooling balls defining an orthogonal plane system. A series of net pads, clamps and pins formed on or in the base supports a manufactured part to be checked in a known position relative to the plane system. A plurality of data collection device holders are attached to the base. Each holder has a datum element such as a bushing or the like. The exact positions of the datum elements relative to the plane system are measured and stored in a data storage device. A computer is programmed to accept data from the data collection devices and compensate for variations of the known datum element positions from theoretically perfect positions.

13 Claims, 2 Drawing Sheets

CHECKING FIXTURE WITH COMPUTER COMPENSATION FOR DATA COLLECTION DEVICE LOCATORS

BACKGROUND OF THE INVENTION

This invention relates broadly to the field of quality control of manufactured parts. The typical quality control program involves some kind of comparison of the parts as made with the design specifications for the part. One way this has been done in the past was to build a checking fixture that mounted a part to be checked in an accurate, repeatable fashion on a base plate. The base plate carries a variety of mechanical devices accurately manufactured and located to correspond to the part as designed (the part as designed will be referred to herein as the perfect part or the nominal part). Thus, mechanical devices such as flush rails, feeler rails, templates and SPC (statistical process control) datum checks are built into the fixture to, in effect, simulate the perfect part. Parts to be checked are mounted in the fixture and compared with these mechanical simulations of the perfect part.

Flush rails are walls having an edge parallel to an edge of the nominal part. A straight edge held against the flush rail should also just be in contact with the edge of the part. Feeler rails are walls whose faces are located parallel to and a specified distance from the nominal part. A feeler gauge having a thickness equal to the specified distance is placed between the rail and part to check for discrepancies from the design. Templates are hinged blocks that fold down over the top of a mounted part. The contour of the template matches that of a perfect part. Again, a feeler gauge is placed between the template and part to test the accuracy of the part being checked.

SPC datum locators are mounting brackets for transducers or other distance measuring devices. Each SPC point has a bushing or other feature that is located normal to the nominal part and at a fixed, known distance from it. Typically, that distance has been chosen to be 31 mm. The transducer is calibrated to read variations from this known distance when the transducer is properly mounted relative to the bushing. Thus, to obtain correct results, the fixture has to be built such that the bushing (or other feature) is precisely normal to and, typically, 31 mm from the nominal part.

It can be seen that building these mechanical devices into a checking fixture requires slow, painstaking effort often involving repeated cycles of fabrication, checking, correcting and rechecking. For example, consider an SPC datum locator that is mounted to a base plate by means of holes in the base. Once the holes are drilled they are checked for accuracy on a coordinate measuring machine (CMM). If a hole is not located within a few ten-thousandths of an inch of the design, it must be plugged (by pounding a chunk of metal into the hole in a press fit), welded, filed and polished so that the holes can be redrilled, hopefully in the right place. Naturally all this effort risks adversely affecting other parts of the fixture already in place. Also quite naturally this effort leads to high costs for a checking fixture which, it will be noted, may be suitable for use only with one, unique part.

The present invention overcomes the difficulties of simulating the nominal part with physical, mechanical components mounted on a base. It does so by dispensing with devices dependent on feeler gauges, using only distance measuring devices whose holders need not be located with absolute precision.

SUMMARY OF THE INVENTION

This invention concerns a checking fixture having computer compensation for the locations of distance measuring device holders. A primary object of the invention is a checking fixture which permits relatively low tolerance location of its mechanical features, other than the part mounting means. The locations of the mechanical features are measured, and any deviation from the designed locations are recorded and compensated for in a computer. The resulting fixture affords significant cost savings without sacrificing accuracy.

The checking fixture of the present invention has a base plate with starts in the form of either origin surfaces or tooling balls. Net pads, clamps, zero pins and the like grip and support a part to be checked in a known, accurate and repeatable position. Data collection device holders are mounted near a part to be checked. Each holder has a datum element. Data collection devices are mounted in the holders with respect to this datum element. The precise location and orientation of each datum element with respect to the starts are measured and recorded in a data storage device, such as a floppy disk.

Use of the fixture entails placing the part in the mounting means and putting data collecting devices in each of the holders, either multiply or seriatim. Distance readings are taken and stored. These readings represent distances from the datum element of the holder to the checked part. A computer program calculates the coordinates of the part based on the known location and orientation of the datum element and the distance readings. These calculated actual points are compared with CAD data describing the perfect part, to show how close the manufactured part comes to the perfect part.

The computer can also compensate for holders that are out of position such that the data collecting device will not contact the part at the intended location. The software will compare the known datum element location and orientation with the perfect part to see where the data collecting device will hit. A compensation factor based on the shape of the part and the actual datum element location can be calculated to correct the data read from that holder.

DETAILED DESCRIPTION OF THE INVENTION

Figure 1:
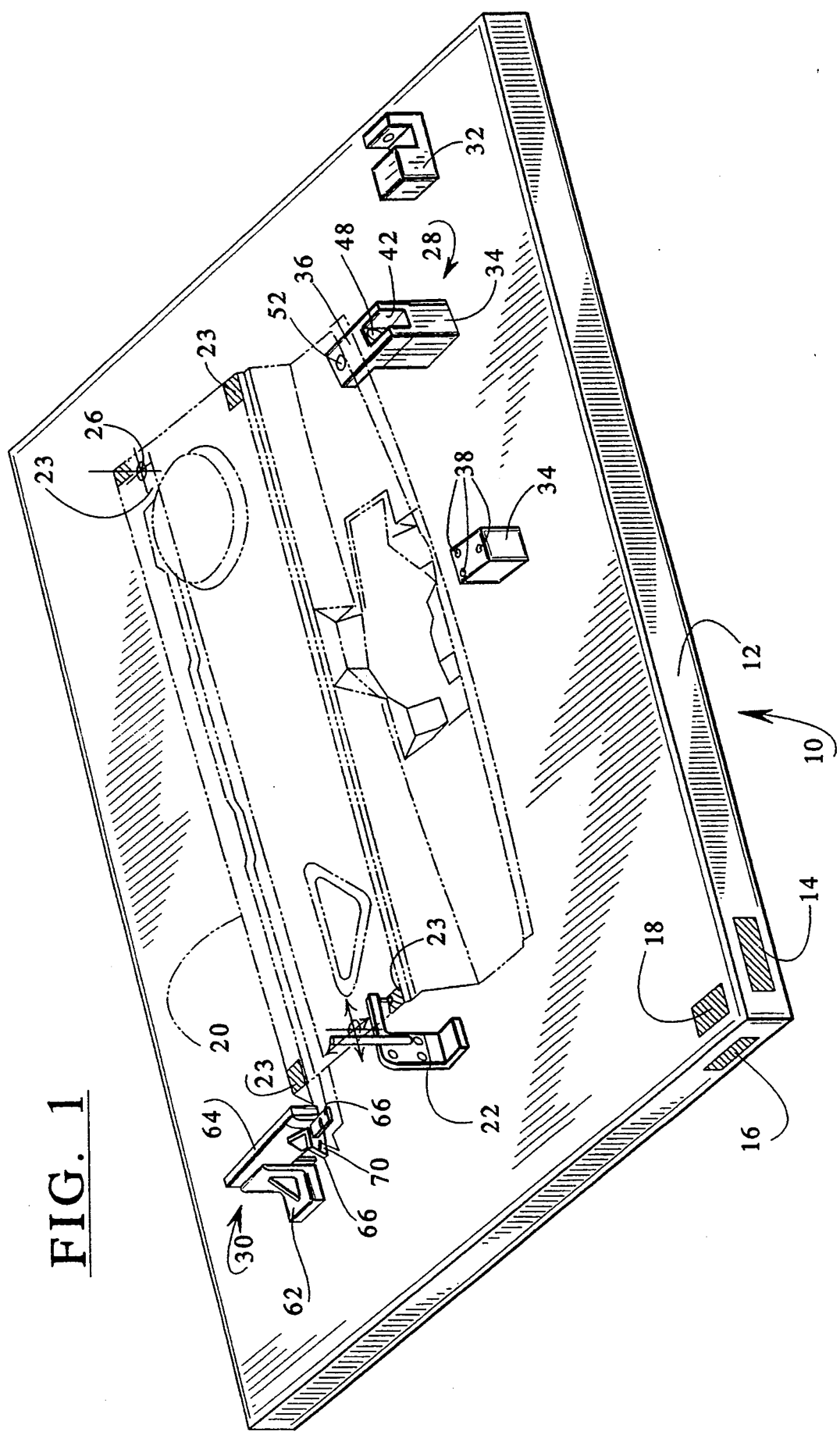
FIG. 1 is a respective view of a typical checking fixture according to the present invention.

A checking fixture according to the present invention is shown at 10 in FIG. 1. It will be understood that this representation is merely illustrative of a typical fixture configuration and that the invention is not limited to any particular arrangement of transducer holders. Fixtures according to the invention could have an infinite variety of layouts of transducer mounting devices, according to the needs of a particular part.

The fixture 10 has a base 12 which in this case is a generally flat plate made of aluminum or other suitable metal. The base has three origin surfaces or base edges 14, 16, 18 which define a orthogonal plane system having an origin point. Components mounted on the base whose positions are critical are mounted with respect to this origin. Alternately, the origin could be defined by tooling balls as known in the art. These origin-defining elements, in whatever form, will be referred to herein as starts.

A manufactured part to be checked is shown in phantom at 20. In this case the part is a material of the type frequently used in the automotive industry. Mounting means are formed on the base for securing the part to the base in a known, accurate and repeatable manner. The particular mounting means depends on the part but will include some combination of previously-known components such as net points and clamps and/or zero pins. A net point is a pad whose location relative to the starts is known. The clamp is hinged to close down over the top of the part above the net point and hold the part firmly against the net point. The net and clamp areas of the part are illustrated at 23. A typical clamp is shown at 22. Zero pins are mounted in precision holes in the base and extend through holes in the part. A four-way pin that restricts movement of the part in four directions is shown schematically at 24. A two-way pin that restricts the part in two directions is shown schematically at 26.

It will be understood that the exact choice of components for the mounting means is not critical. Different designers might choose different arrangements for the same part, both arrangements equally acceptable. What is important is that the mounting means support the part on the base in an accurate and repeatable fashion.

The designers of the manufactured part will specify which points on the part are of critical importance. These are called SPC (statistical process control) points. Measurements will be taken at least at these points to gauge product quality. Additional reading points may also be specified for taking more measurements that can be connected by CAD software to provide a mathematical or graphic representation of the manufactured part. Frequently it is desirable to then compare the manufactured part, as defined by the readings, with the perfect part, as defined by the designer's data in a CAD database.

To enable the taking of measurements at the SPC points (and additional reading points, if desired), the fixture has a plurality of holder means for data collection devices. The holders are attached to the base 12 near the manufactured part 20. The holders are intended to be disposed a specified distance from the SPC points, but in the present invention the tolerance for this distance can be as much as a quarter of an inch or so, as compared with a few ten-thousandths of an inch in the prior art. Also, the holders must be arranged to support a measuring device normal to the surface of the part. Especially in thin materials forming, it is important to define displacement in terms of normal to the surface. Here again, the present invention can tolerate deviations from normal that heretofore were totally unacceptable.

The holders can take a variety of forms, two of which are shown at 28 and 30 in FIG. 1. Details of these will be described below. Each holder means has a datum element which is a surface, point, edge, hole, ball or some other physical feature which can serve as a measurement location for determining where the holder is in relation to the starts. It is actually the datum element of the holder which is supposed to be a reference distance from the perfect part.

The holders mount at least one data collection device for measuring the distance from the datum element of that holder to the part being checked. The data collection device can be of any suitable type. Examples are probe transducers, flush and gap transducers, dial indicators and digital readouts. While transducers are shown and preferred, it will be understood that the invention is not limited to a particular type of distance measuring equipment.

Transducers are typically calibrated to provide a plus or minus reading compared to a reference distance. A zero block 32 may be provided on the base for this purpose. A transducer inserted in the zero block is adjusted until it outputs a zero reading. Then when the transducer is used, a zero output will mean that it is exactly the reference distance from the part being measured.

Figure 2:
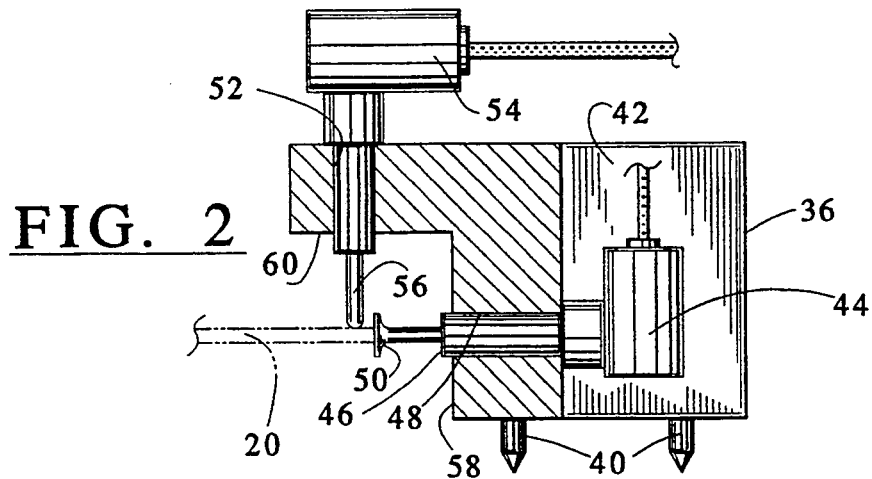
FIG. 2 is a section through one type of data collection device holder.

Turning now to the details of holder means 28, this type of holder has two main parts, a block 34 and a carrier 36. The block is fixed to the base 12 in any suitable manner. The top of the block has holes 38 which receive pins 40 (FIG. 2) on the underside of the carrier 36. The carrier rests on top of the block with its relation thereto fixed by the cooperation of the pins 40 and holes 38. The carrier can be transferred from one block to another to take readings at the various points using the same transducers.

The carrier itself has a cavity 42 for receiving a transducer 44. The barrel 46 of the transducer fits through an aperture 48 in the carrier. A probe 50 performs a flush check against the edge of part 20. A second aperture 52 receives the barrel of a second transducer 54. Second probe 56 performs a feeler check on part 20. The carrier has two datum elements, one for each transducer. The datum element for transducer 44 is surface 58, while surface 60 provides the datum element for transducer 54.

Figure 3:
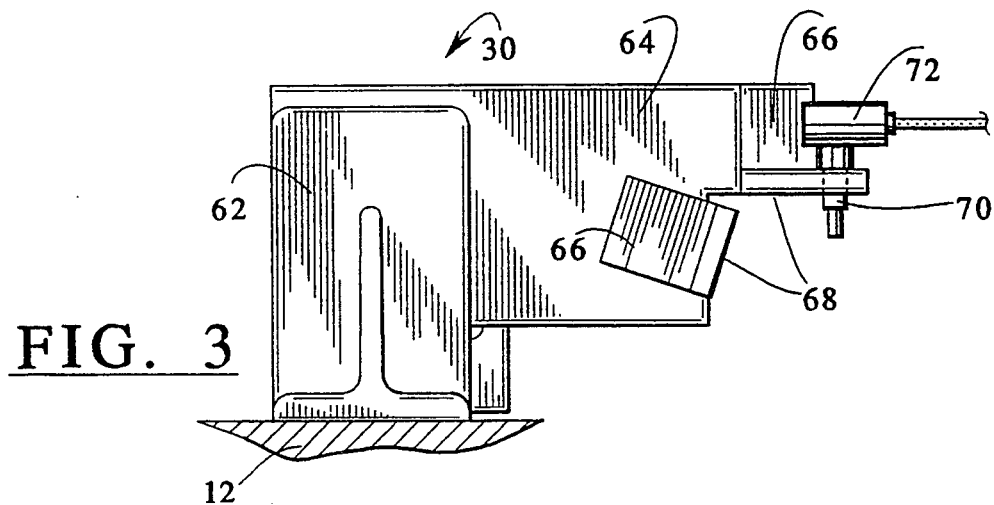
FIG. 3 is a side elevation view of another type of data collection device holder.

FIG. 3 illustrates an alternate holder 30 which also can be used for checking the part. It includes an angle bracket 62 fixed to the base. An arm 64 is hinged to angle bracket 62. The arm carries one or more support brackets 66. Each support bracket has a datum element in the form of a surface 68. The support brackets 66 have apertures 70 for receiving transducers 72.

Figure 4:
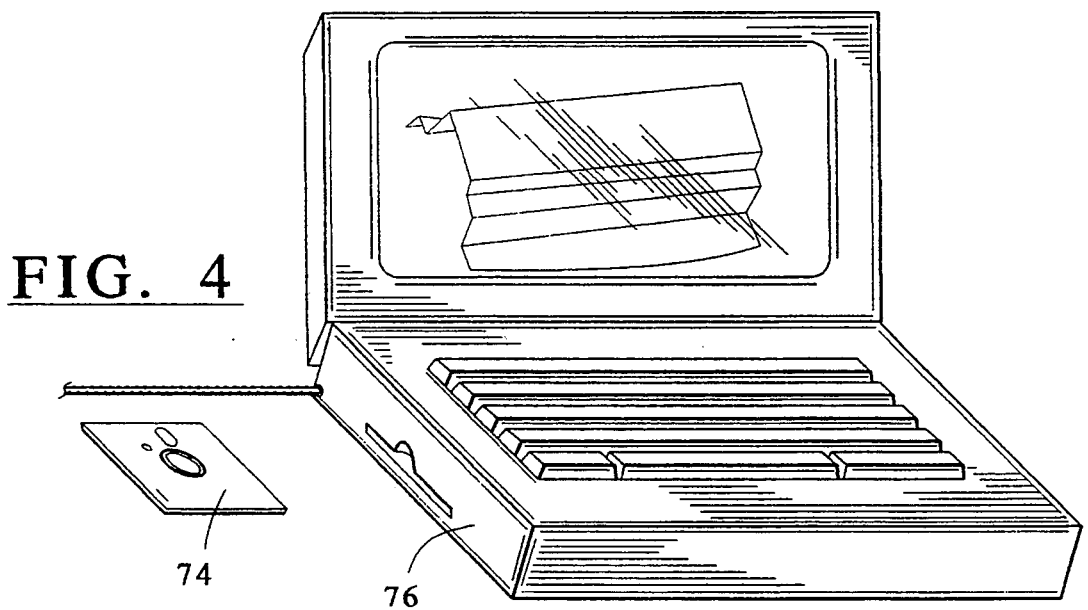
FIG. 4 is a diagrammatic perspective view of the data storage device and computer used with the checking fixture.

FIG. 4 schematically shows a data storage means 74, in this case a floppy disk. The floppy disk is a critical part of the fixture in that it contains data describing the actual positions of all datum elements relative to the starts. That is, once all the data collection device holder means are mounted on the base, the position and orientation of each datum element is determined (typically on a coordinate measuring machine) and recorded on the data storage means. This information can be compared in computer 76 to the CAD data of the perfect part to determine if the datum element is a specified reference distance (such as 31 mm) away from the perfect part. In the past if it were not, the location of the holder would be physically corrected. In the present invention the holder is not moved; its actual position is simply recorded and used to calculate a correction factor.

The use and operation of the invention are as follows. A part 20 to be checked is mounted in the fixtures with zero pins, nets and clamps or whatever. One or more transducers are calibrated. The user instructs software in computer 76 what type of check is to be performed, whether just SPC points are going to be checked or SPC points and any or all additional reading points as well. The software instructs the user in which holder a transducer(s) should be mounted. The user places the transducer in the appropriate holder and a distance measurement is taken. The raw data is a deviation figure from the reference distance. Once this data is recorded in the computer, the transducer is moved to the next holder for the next reading. This continues until all necessary points are taken.

At this point software in the computer takes over. At least two types of outputs are available. One is a point by point determination of variance from the perfect part. The other is an overall determination of the shape of the checked part and a graphical comparison with the perfect part. Consider the former. At a point x, the computer is told where point x is on the perfect part. From this it can calculate where a theoretical datum element for point x should be. If the known, actual datum element happens to coincide with the theoretical datum element, then the raw transducer output would also be the actual deviation (if any) from the reference distance. Most often, however, the actual and theoretical datum elements will not coincide but the computer can calculate a correction factor which is based on the difference (in both angle and distance) between the theoretical and actual datum elements. The computer applies this correction factor to the raw transducer data to find the actual deviation from the reference distance.

As an example of how this might work in practice, suppose a checked part corresponds exactly at point x to the perfect part. But the transducer reports a +2 mm deviation of point x from the reference distance (and therefore from the perfect part). However, the data in the computer shows the datum element for the point x holder is also +2 mm off from the theoretical datum element. The software calculates a −2 mm correction factor, applies this to the +2 mm reading and reports that point x is exactly as designed. While this example treats only distance, it will be understood that the software works with three dimensions and will correct for angular misalignment as well.

The second type of computer output referred to above requires the calculation of the correction factor just described with a further translation of the actual deviation figures into spatial coordinates of all points on the checked part. Then all of the points are connected to create a CAD depiction of the checked part. This can be compared to the CAD data for the perfect part to reveal variations.

The software will also be designed to provide a correction for transducers not hitting the part at the intended spot. Suppose the part designers elect a point x on their part for checking. A data collection device holder is mounted on the base near where point x will be when the part is mounted in the fixture. But the datum element of that holder is found to be misaligned such that a transducer mounted in it will not actually contact the part at point x but at a point y which is offset from x. The software will assume there are no gross local variations in the perfect part between x and y and, using the CAD description of the perfect part, figure out what the distance and orientation are between point y and the actual datum element. The raw transducer output is then corrected for both the datum element position and the part position where the transducer actually contacts it.

It can be seen that the present invention affords significant advantages over the prior art in that transducer holders do not have to be relocated after their actual positions are determined. Instead those actual positions are recorded and used as the basis for calculating correction factors applied to transducer output.

Whereas a preferred form of the invention has been shown and described, it will be realized that modifications and variations may be made thereto without departing from the scope of the following claims.

We claim:

1. A checking fixture for comparing dimensions of manufactured parts to a perfect part as designed, comprising:
   a base having starts formed therein;
   mounting means on the base for supporting a manufactured part to be checked in a known position relative to the starts;
   a plurality of data collection device holder means attached to the base for mounting a data collection device near the manufactured part, each holder means having a datum element;
   at least one data collection device mountable on said holder means for measuring the distance from the datum element of that holder to the part being checked;
   data storage means for storing data descriptive of the known location and orientation of the datum elements of the holders relative to the starts, and the distance measurements taken by the data collection device; and
   computing means operable on the data stored in the data storage means, for calculating the location of a checked point on the part being checked, based on the known location and orientation of the datum element and the data collection device's distance measurement from the datum element.

2. The checking fixture of claim 1 wherein the computing means includes means for calculating the coordinates of the checked point relative to the starts.

3. The checking fixture of claim 2 wherein the data storage means further contains data descriptive of the perfect part relative to the starts, and the computing means includes means for comparing the calculated coordinates of the checked points on the checked part to the corresponding points on the perfect part.

4. The checking fixture of claim 3 further comprising means for displaying the comparison between the calculated coordinates on the checked part and the corresponding points on the perfect part.

5. The checking fixture of claim 1 further comprising means mounted on the base for defining a reference distance and wherein the data collection device is calibrated to provide measurements in terms of measured deviations from said reference distance.

6. The checking fixture of claim 5 wherein the data storage means further contains data descriptive of the perfect part relative to the starts, and wherein the computing means includes means for:
   a) calculating a theoretical datum element location and orientation which is normal to and spaced from the perfect part by the reference distance,
   b) calculating a compensation factor based on the difference between said theoretical datum element location and orientation and the known datum element location and orientation for a particular point, and c) applying the compensation factor to the measured deviation to find an actual deviation of the checked part from the reference distance and normal orientation.

7. The checking fixture of claim 5 wherein the means for defining a reference distance comprises a zero block.

8. The checking fixture of claim 1 wherein the data collection device is a transducer.

9. The checking fixture of claim 1 wherein the data storage means further contains data descriptive of the perfect part relative to the starts, and the computing means includes means for;
 a) comparing the known datum element location and orientation for a particular holder to the perfect part, and
 b) calculating the point on the perfect part to which the data collection device mounted in said particular holder would measure the distance.

10. In a checking fixture for comparing dimensions of manufactured parts to a perfect part as designed, the fixture comprising a base having starts formed therein, and mounting means on the base for supporting a manufactured part to be checked in a known position relative to the starts, an improved method of preparing the fixture for use, comprising the steps of:
 attaching a plurality of data collection device holder means to the base, each holder means having a datum element;
 measuring the position and orientation of each datum element relative to the starts; and
 storing the datum element measurements in a data storage means to create a database descriptive of the known location and orientation of the datum elements of the holders relative to the starts.

11. In a checking fixture for comparing dimensions of manufactured parts to a perfect part as designed, the fixture comprising a base having starts formed therein, and mounting means on the base for supporting a manufactured part to be checked in a known position relative to the starts, an improved method of checking parts, comprising the steps of:
 attaching a plurality of data collection device holder means to the base, each holder means having a datum element;
 measuring the position and orientation of each datum element relative to the starts;
 storing the datum element measurements in a data storage means to create a database descriptive of the known location and orientation of the datum elements of the holders relative to the starts;
 measuring the distance from the datum elements to specified points on the part being checked; and
 calculating the location of a checked point on the part being checked, based on the known location and orientation of the datum element and the measured distance.

12. The method of claim 11 further comprising the steps of defining a reference distance and providing measurements in terms of measured deviations from said reference distance.

13. The method of claim 12 further comprising the steps of:
 a) storing in the data storage means data descriptive of the perfect part relative to the starts;
 b) calculating a theoretical datum element location and orientation which is normal to and spaced from the perfect part by the reference distance;
 c) calculating a compensation factor based on the difference between said theoretical datum element location and orientation and the known datum element location and orientation for a particular point; and
 d) applying the compensation factor to the measured deviation to find an actual deviation of the checked part from the reference distance and normal orientation.

* * * * *